March 23, 1937.  J. E. OTT  2,074,934
FOLDING BOX
Filed Nov. 25, 1932  6 Sheets-Sheet 5

Inventor
John Ekern Ott
By Rector, Hibbey, Davis & Macauley Attys.

Patented Mar. 23, 1937

2,074,934

UNITED STATES PATENT OFFICE 2,074,934

FOLDING BOX

John Ekern Ott, Lisle Township, Du Page County, Ill., assignor to Acme Steel Company, Chicago, Ill., a corporation of Illinois Application November 25, 1932, Serial No. 644,209

6 Claims. (Cl. 217—43)

This invention relates to improvements in folding boxes or crates in which the outer walls normally occupy a flat relationship but are flexibly connected so that they may be formed into box or crate-forming relationship and assembled with respect to end walls to form a complete enclosure within which articles may be packed for shipment. Boxes or crates of this type have ordinarily been constructed as wire-bound boxes or crates in which the outer walls are flexibly connected and secured together by binding wires which permit these walls to be folded about the outer edges of the end walls, but no satisfactory method has heretofore been provided for securing the end walls against displacement longitudinally of the surrounding walls, resulting in inconvenience in assembling the box and damage to the goods being shipped. The principal object of the present invention is to provide an improved folding box or crate having novel means for securing the end walls to the surrounding folding walls so that the end walls remain definitely in place, even when the box is unfilled, and hold the bottom and side walls in assembled relationship during the process of filling. Still another object is to provide a folding box or crate comprising end walls and surrounding folding walls having cooperating interlocking metallic members which permit the end walls to be assembled readily with respect to the folding walls and also allow the parts to be readily disassembled when it is desired to unfold or collapse the box or crate. A further object of the invention is to provide a folding box or crate having folding walls and cooperating end walls which are provided with metallic strips adapted to be moved into interlocking engagement with each other either by a relative longitudinal sliding motion or by pressing one member laterally against the other. Still another object of the invention is to provide a folding box or crate having end walls and surrounding folding walls provided with interlocking metallic strips having beaded portions adapted to have a telescoping engagement with each other and to be assembled by snapping one bead into position within the other. Another object of the invention is to provide a folding box or crate comprising end walls and surrounding folding walls which are provided with interlocking metallic strips secured to the walls in a novel manner and located so that they are not exposed to the contents of the box or crate. Other objects relate to various features of construction and arrangement which will appear more fully hereinafter.

The nature of the invention will be understood from the following specification taken with the accompanying drawings, in which several embodiments are illustrated. In the drawings.

As illustrated in Figs. 1 to 5, inclusive, the invention is illustrated as being embodied in a wirebound box or crate comprising a bottom wall 25, a pair of side walls 26, a top wall 27 and a pair of end walls 28. The bottom wall 25, the side walls 26 and the top wall 27 are secured together by wires 29, or other flexible binders, which are attached to the outer sides of these walls by means of staples 30 and these walls, when unfolded, occupy the relative positions shown in Fig. 4, so that the outer walls of a number of separate boxes or crates may be piled upon each other and shipped in a bundle.

The bottom wall 25 has secured to its inner side at its ends a pair of transverse cleats 25a of rectangular cross-section which are formed preferably of wood and which are adapted to form a dovetailed connection with two similar cleats 26a which are secured to the inner sides of the end portions of the side walls 26. The upper ends of the cleats 26a are adapted to form dovetailed connections with cleats 27a which are secured to the inner side of the top wall 27. All of these cleats are preferably put in place before the binding wires 29 are attached so that when the staples 30 are driven over the wires at the ends of these walls, the staples will pass into the cleats. Each cleat 25a is provided at one end with a tongue 25b and at the other end with a groove or slot 25c and the other cleats 26a and 27a are similarly provided with tongues 26b and 27b and grooves 26c and 27c, respectively, so that when the walls are folded upon each other from the relationship shown in Fig. 4 to the complete box or crate-forming relationship, the tongue on the end of one cleat engages a groove in the end of a cleat on the next adjacent wall section, thus forming complete dovetailed connections between the cleats of the folding wall members at each corner of each end of the box or crate.

Figures 1, 2, 3:
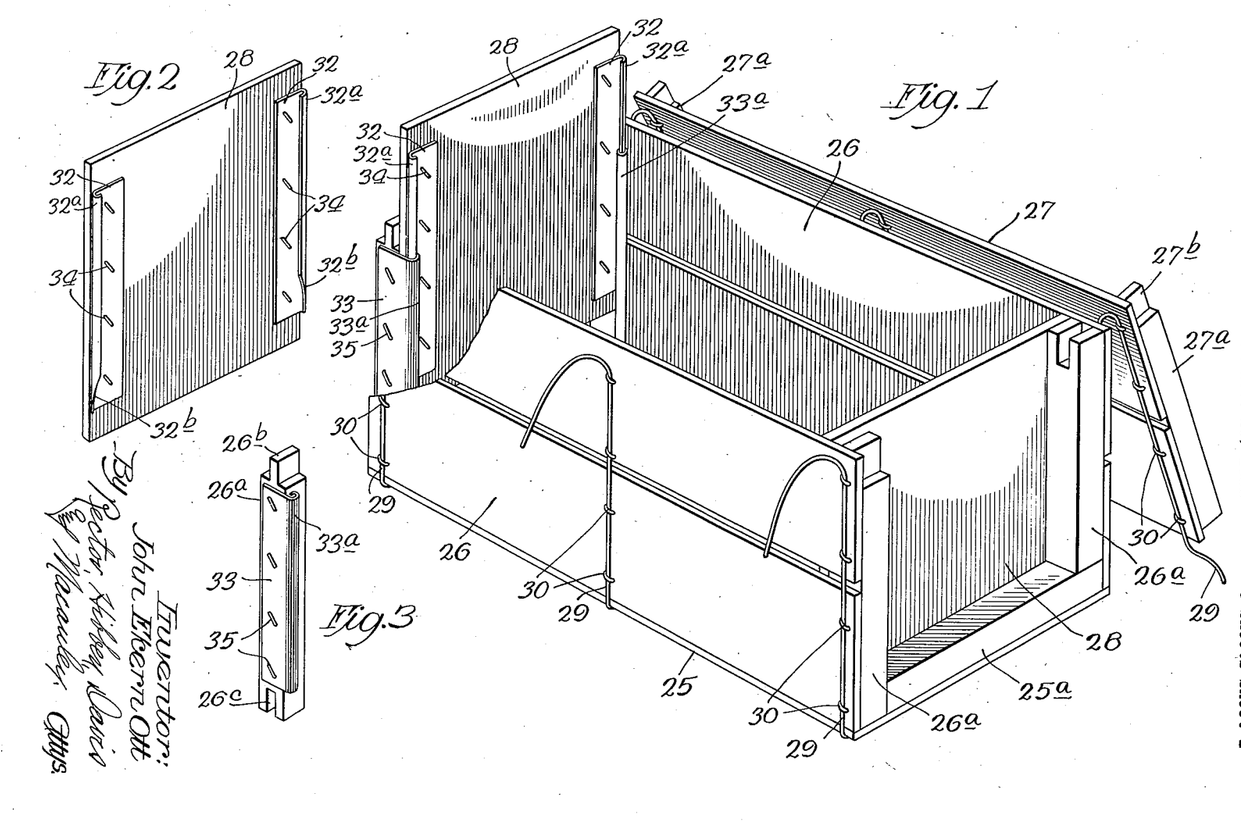
Fig. 1 is a perspective view of one form of the improved folding box or crate with a portion of one of the side walls broken away and with the top wall or cover in open position.
Fig. 2 is a perspective view of one of the end walls embodied in the construction shown in Fig. 1.
Fig. 3 is a perspective view of one of the cleats and the attached metallic member which are secured to the ends of the side walls of the construction illustrated in Fig. 1.
Figure 4:
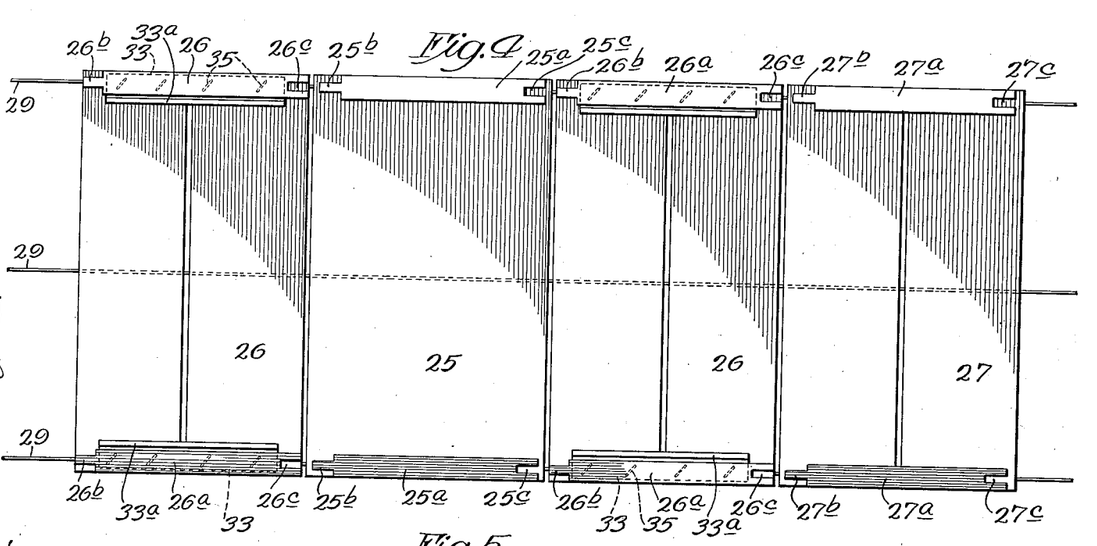
Fig. 4 shows a plan view of the outer folding walls of the construction of Fig. 1 when they have been unfolded to occupy one plane.
Figure 5:
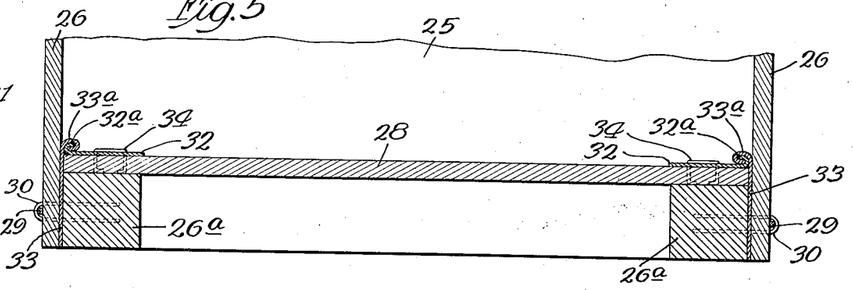
Fig. 5 is an enlarged horizontal section through one end of the box or crate illustrated in Fig. 1.

The end walls 28 are preferably formed as comparatively thin wooden sheets of rectangular form, the edges of which are adapted to be surrounded by the outer folding walls when the box or crate is assembled and they are adapted to seat against the inner sides of the cleats 25a, 26a, and 27a which are secured to the ends of these folding walls. In order to prevent inward movement of these end walls with respect to the cleats, after the box or crate has been assembled and filled, and also to facilitate the holding of the side walls and end walls in proper relationship for filling, before the cover has been put in place, these end walls are provided with means for forming interlocking connections with the end portions of the side walls. This is accomplished by securing to each vertical edge of each end wall 28 a metallic strip or locking member 32 having formed along its outer edge an inwardly turned bead 32a which is adapted to have a telescoping interlocking engagement with the beaded portions 33a of two metallic strips or locking members 33 which are secured to the ends of the side walls 26. The strips 32 are secured to the end walls by wire stitching or staples 34 and the strips 33 are secured to the cleats 26a of the side walls by wire stitching or staples 35. The strips 32 and 33 are of equal length and are preferably of such length as to extend between the inner ends of the tongue 26b and groove 26c formed on the same cleat, as illustrated particularly in Fig. 3. The outer portion of the bead 32a on each strip 32 is located substantially flush with the outer edge of the wall 28 to which it is attached and it is adapted to have a sliding telescoping engagement with the bead 32a on an adjacent side wall so that after the two side walls 26 have been folded into positions wherein they lie substantially at right angles to the bottom wall 25, the end walls may be moved downwardly as illustrated in Fig. 1, to cause the beads 32a at opposite edges of each end wall to interlock with the beads 33a carried by the adjacent ends of the side walls. The extent of this movement is limited by the engagement of the lower edge of the end wall with the upper surface of the bottom wall and the upper edge of the end wall then lies in the same plane as the upper edges of the side walls. The body portion of the bottom wall is illustrated as extending slightly beyond the ends of the cleats 25a attached thereto so that when the side walls have been folded to extend upwardly from the bottom wall, their lower edges rest upon the bottom wall and abut against the ends of the cleats 25a. The length of the binding wires 29 between adjacent wall sections, when the parts are in the flat relationship shown in Fig. 4, is such as to permit the edges of the side walls to rest on the upper surface of the bottom wall when these walls are assembled as shown in Fig. 1 and to maintain the edges of these walls in contact with each other. To facilitate the passing of the beads 32$^a$ into telescoping engagement with the beads 33$^a$, the lower portions of the beads 32$^a$ are preferably cut away along curved lines 32$^b$, as shown in Fig. 2, so that they are somewhat pointed at their lower ends and may be passed radially into engagement with the upper ends of the beads on the side wall members. Although in this embodiment the side walls and top walls have been shown as being made up of separate longitudinal wooden members spaced apart and secured to the cleats 26$^a$, it will be apparent that the improved features of the present invention may be embodied in a box in which all of the walls are continuous like the bottom wall 25. The ends of the binding wires 29 project beyond the upper edge of one side wall and beyond one edge of the top wall and when the walls of the box or crate have been assembled for filling, in the manner illustrated in Fig. 1, so that when the box or crate has been filled, the top wall may be folded over the crate with its cleats 27$^a$ forming dovetailed connections with the upper ends of the cleats 26$^a$ and with the body portion thereof overlapping and resting upon the top edges of the side walls 26. The ends of each binding wire 29 may then be twisted together or otherwise secured in order to prevent disassembly of the walls of the box during storage and shipment.

Figure 6:
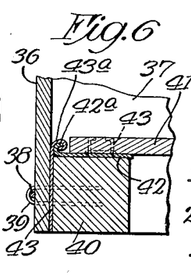
Fig. 6 is a horizontal section similar to a portion of Fig. 5 illustrating a modified form of construction in which the metallic strip carried by the end wall is located on the outer face thereof.

In the form of the invention described above, the metal locking strips are secured to the inner sides of the end walls, thus permitting the end walls to seat directly against the inner sides of the cleats which are attached to the ends of the side walls. That relationship of the parts locates the metal strips in positions where they may contact with the contents of the crate or box, which may be undesirable in the case of some commodities and there has been illustrated in Fig. 6 a modified form of construction which may be in all respects similar to that illustrated in Figs. 1 to 5, inclusive, except that the metal strips carried by the end walls are located on the outer sides thereof and the beads are so formed on this member and on the metal strips carried by the side walls that the telescoping beads are interposed between the ends of the end walls and the adjacent surfaces of the side walls, thus making it practically impossible for these metal strips to engage the contents of the box or crate in the shipment of most commodities. In this modified construction, the surrounding folding walls, including the side walls 36 and bottom wall 37, are secured together by binding wires 38 attached thereto by staples 39. The side walls 36 have wooden cleats 40 secured to the ends thereof and the end walls 41 are adapted to fit between the side walls on the inner sides of these cleats and to rest upon the bottom wall 37. A metal locking strip 42 is secured to each vertical edge of each end wall 41 by means of staples 43 or the like, these members 42 being attached to the outer sides of the walls 41 so that they contact directly with the inner faces of the cleats 40. Each strip 42 extends beyond the adjacent vertical edge of the end wall 41 to which it is attached and terminates in an inwardly turned bead 42$^a$ adapted to have an interlocking telescoping engagement with a correspondingly formed bead 43$^a$ which forms a part of a metal locking strip 43 secured to the end of the adjacent side wall 36 between the body portion of the side wall and the vertical cleat 40. When the parts are assembled, the telescoping beads occupy the space between the end of the end wall 41 and the adjacent inner face of the side wall and do not project into the interior of the box beyond the inner vertical face of the end wall. The parts of this modified form of box or crate construction are assembled in the same manner as described in connection with the form shown in Fig. 1.

Figure 7:
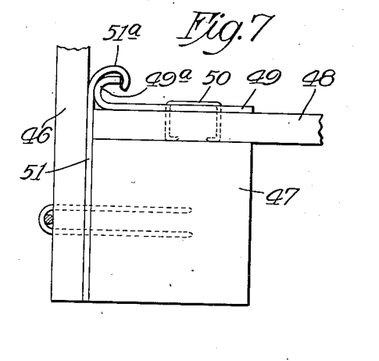
Fig. 7 is a horizontal section similar to those of Figs. 5 and 6, showing a modified form of construction like that of Fig. 5, except that the beaded portions of the metallic strips are so formed as to permit the bead on one strip to be snapped into interlocking engagement with the bead on the other strip.
Figure 8:
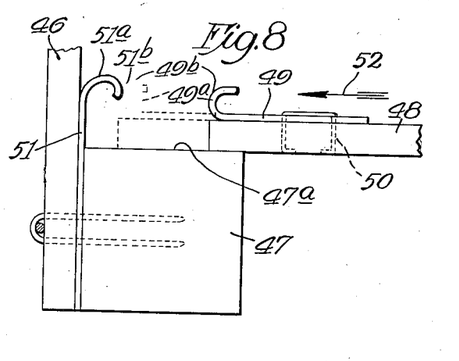
Fig. 8 is a horizontal section similar to that of Fig. 7, showing the parts of Fig. 7 before the end wall has been snapped into interlocking engagement with the metallic strip carried by the adjacent side wall.

In both forms of the invention heretofore described, the construction of the beads on the metallic locking members has been such as to require them to be passed into interlocking engagement with each other by a relative longitudinal sliding movement and, although this is an effective and convenient way of bringing about the interlocking connection in most instances, it has been found that a modified form of construction may be employed to permit the beads to be snapped into interlocking engagement with each other by pressing one upon the other in a direction substantially transverse to their longitudinal axes and this method of procedure is more convenient in many instances. In Figs. 7 and 8 there is shown a modified form of construction which is in all respects similar to that shown in Figs. 1 to 5, inclusive, except for the formation of the beads on the interlocking members. In this form, the side wall 46 has secured thereto a vertical cleat 47 which is engaged on its inner vertical face by the end wall 48. This end wall has a metal locking strip 49 secured thereto by staples 50 and this strip is provided along its edge with a bead 49$^a$ adapted to interlock with a bead 51$^a$ formed upon another metallic locking strip 51 which is secured to the side wall 46 with the body portion thereof interposed between the side wall and the cleat 47 which forms a part thereof. This strip 51 extends inwardly beyond the position normally occupied by the end wall 48 and terminates in the reversely curved half-bead 51$^a$ which is adapted to interlock with the partial bead 49$^a$ formed on the strip 49 in the manner shown in Fig. 7. The interlocking connection is brought about by placing the end wall 48 against the surface 47$^a$ of the cleat 47, as shown in Fig. 8, and then effecting relative movement of the side wall and the end wall in the direction indicated by the arrow 52 until the end wall reaches the position illustrated by dotted lines where the edge or extremity 51$^b$ of the bead 51$^a$ engages the outer surface of the bead 49$^a$ at a point 49$^b$ which is spaced inwardly from the center of curvature of the bead 49$^a$, that is, toward the interior of the box from that center of curvature. This line of initial contact of the beads is also located outwardly, that is, toward the end of the box, from the center of curvature of the bead 51$^a$. After this initial contact has been established, the result of further pressure being exerted upon the contacting parts is to cause the beads to yield position within the bead 51$^a$. The metal of sufficiently to permit the bead 49$^a$ to snap into which the strips 49 and 50 are formed should be comparatively stiff but it should have sufficiently resiliency to permit this snapping action to take place with a return of the metal of the beads to its original condition as the bead 49$^a$ passes to a position within the bead 51$^a$. Of course, this construction also permits the parts to be passed into interlocking engagement by the sliding telescoping action described in connection with Fig. 1, but it has the additional advantage that the parts may be snapped into engagement with each other by first placing the end wall on the bottom wall between the upturned side walls and then snapping the end wall directly into interlocking engagement with the side walls by relative motion between them.

Figure 9:
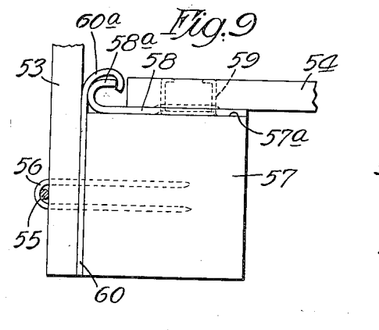
Fig. 9 is a horizontal section similar to that of Fig. 6, showing a modified construction in which the metallic strip is located on the outer side of the end wall and is capable of being passed into interlocking engagement with the strip on the side wall by a lateral motion transversely to the axes of the interlocking beads.
Figure 10:
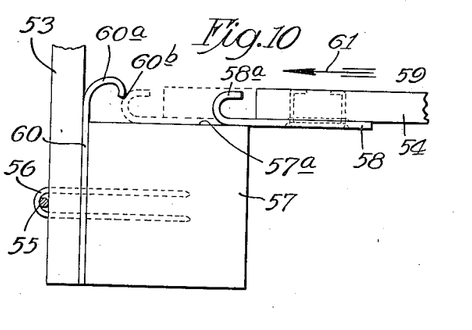
Fig. 10 is a horizontal section like that of Fig. 9, showing the parts of Fig. 9 before they have been snapped into interlocking engagement with each other.

In Figs. 9 and 10 there is illustrated still another form of the invention in which the telescoping interlocking members may be snapped into engagement with each other. This form is similar to that illustrated in Fig. 6 except that the beads are formed to permit one to be snapped into the other. In this form, the side wall 53 is secured to the other walls which surround the end walls 54 of the box or crate, by means of flexible binding wires 55 which are attached thereto by staples 56. A vertical cleat 57 is secured to each end of each side wall 53 and is engaged on its inner vertical face 57a by the metallic locking strip 58 which is attached to the end wall 54 by means of staples 59 or the like. The plate 58 extends beyond the vertical edge of the end wall and terminates in an inwardly directed bead 58a which is adapted to interlock with a partial bead 60a formed along the inner edge of a locking strip 60 which is secured to the side wall 53 and interposed between the body portion of the side wall and the cleat 57. In assembling the end wall 54 with respect to one of the side walls 53, the end wall is first located in a position where the plate 58 engages the inner face 57a of the cleat as shown in Fig. 10, and then a relative movement of the side wall and the end wall is effected in the direction of the arrow 61 with the result that the bead 58a is brought into engagement with the extreme edge 60b of the bead 60a as shown by dotted lines. The center of curvature of the bead 58a is then located toward the end of the box from the line of contact and from the center of curvature of the bead 60a so that on further pressure being exerted on the end wall and side wall, the metal of these beads, which is sufficiently resilient for the purpose, yields to allow the bead 58a to snap into position within the bead 60a, as shown in Fig. 9. The advantages of the telescoping method of assembly and the snapping method of bringing the parts together are thus obtained in a construction in which the interlocking beads are located in a space between the end of the end wall and the adjacent vertical face of the side wall.

Figure 11:
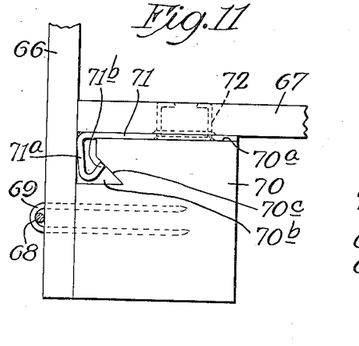
Fig. 11 is a horizontal section similar to that of Fig. 6, illustrating another modification in which a metallic strip carried by the end wall has a beaded portion which is snapped into interlocking engagement with an undercut groove formed in the cleat carried by the side wall.
Figure 12:
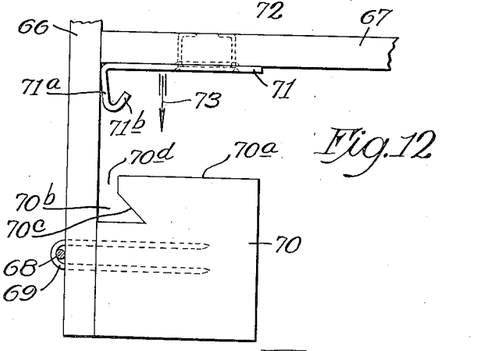
Fig. 12 is a horizontal section similar to that of Fig. 11, showing the end wall and side wall before the interlocking connection has been formed.

The form of the invention shown in Figs. 11 and 12 is one in which the interlocking parts of the end wall and the side walls may be brought into their interlocking relationship either by a sliding action or a snapping action and, preferably, without the necessity of employing a metallic member on either side wall. As here illustrated, the side wall 66 is attached to the other walls which are folded about the edges of the end walls 67 by means of flexible binding wires 68 which are attached thereto by staples 69. The side walls 66 have vertically extending wooden cleats 70 secured to the inner sides thereof and formed preferably of relatively hard wood or other material. Each end wall has a metal locking strip 71 secured thereto by staples 72 or the like and each strip 71 terminates along its outer edge in an inwardly directed flange or bead 71a which engages and interlocks with an undercut groove 70b formed in the inner portion of the member 70 adjacent to the body portion of the wall 66. This groove 70b extends directly inwardly from the face 70a of the cleat and is enlarged at its inner end to form an undercut inclined shoulder 70c adapted to be engaged by the extremity 71b of the bead 71. This interlocking relationship may be brought about by sliding the end wall 67 vertically downward with respect to the cleats 70 on the side walls with the beads 71a engaging the grooves 70b, but it may be more conveniently effected by placing the end wall 67 in the position illustrated by full lines in Fig. 12 and then moving the end wall in the direction indicated by the arrow 73 until the inner extremity of the bead 71a is compressed to snap inwardly from the position shown by dotted lines in Fig. 12 to the position shown in Fig. 11. This requires the compression of the inner portion of the bead 71a to permit it to pass through the neck 70d of the slot 70b and the bead then expands to interlock with the inclined shoulder 70c.

Figure 13:
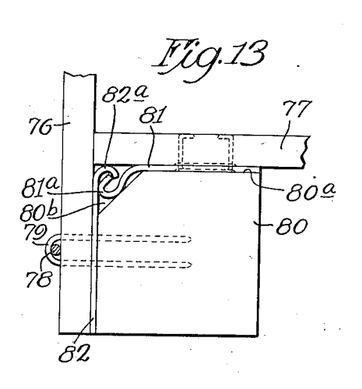
Fig. 13 is a horizontal section similar to that of Fig. 6, showing still another modification of the invention in which the beads on the metallic strips are capable of being snapped into interlocking engagement with each other and in which they occupy a recess formed in the cleat carried by the side wall.
Figure 14:
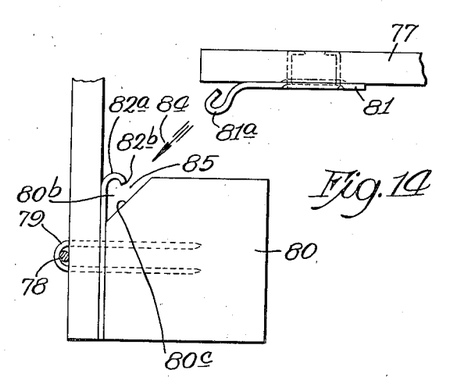
Fig. 14 is a horizontal section showing the parts of Fig. 13 before they have been snapped into interlocking engagement with each other.

In Figs. 13 and 14 there is shown a modification which obtains the advantage of permitting the end wall to be snapped into interlocking engagement with the side wall while at the same time concealing the interlocking beaded members within a recess formed in the wooden cleat so that no parts of the metallic members are exposed to contact with the contents of the box or crate. In this form, the side wall 76 is secured to the other walls which surround the end wall 77 by means of a flexible binder 78 secured thereto by staples 79. A wooden cleat 80 is secured to the side wall 76 and is engaged on its inner face 80a by a metallic locking strip 81 having along its outer edge a bead 81a which is turned inwardly so that it occupies a recess 80b formed by beveling the inner corner of the member 80 adjacent to the side wall. A metallic fastening member 82 is secured to the side wall between the body portion thereof and the cleat 80 and the inner end thereof is turned inwardly to form a half-bead 82a which interlocks with the bead 81a when the walls of the box are assembled. These hooks or beads may be interlocked with each other by sliding them into telescoping engagement as in assembling the form of the invention shown in Fig. 1 and they may also be assembled by snapping the bead 81a into engagement with the bead 82a after locating the end wall substantially in the position shown in Fig. 14, from which position it is moved in the direction of the arrow 84 to cause the bead 81a to be compressed and passed through the restricted passage 85 between the tip 82b of the bead 82a and the inclined beveled face 80c of the cleat 80. This construction thus has the advantages of that shown in Figs. 11 and 12 with the addition that both of the interlocking parts are of metallic construction.

Figure 15:
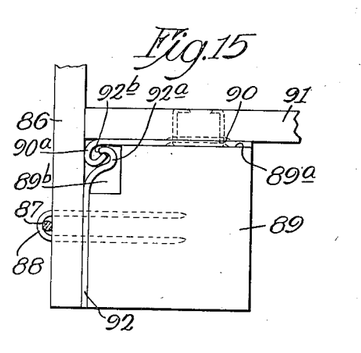
Fig. 15 is a horizontal section like that of Fig. 6, showing a further modification of the invention in which the interlocking beads are snapped into engagement with each other and located in a recess in the wooden cleat carried by the side wall.
Figure 16:
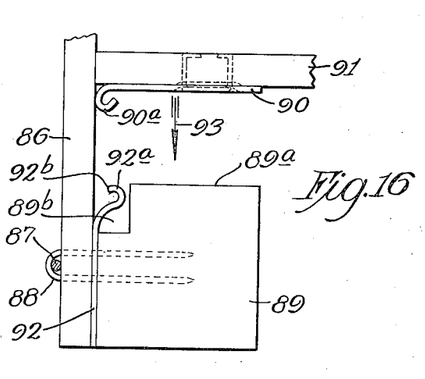
Fig. 16 is a horizontal section showing the parts of Fig. 15 in the relative positions which they occupy before the beads are snapped into interlocking engagement with each other.

In Figs. 15 and 16 of the drawings, there is illustrated still another modification of the invention which is similar to that shown in Figs. 13 and 14, except that the beads are oppositely arranged so that the end wall may be moved parallel to the side wall in causing the beads to snap into interlocking engagement. In this form, the side wall 86 is secured to the other folding walls of the box or crate by means of flexible binding wires 87 which are secured thereto by staples 88. A vertically extending cleat 89 is secured to the side wall and is adapted to be engaged on its inner face 89a by a metal locking strip 90 which is secured to the outside of the end wall 91. The metal strip 90 has its outer edge curled away from the end wall 91 to form a bead 90a adapted to interlock with a half-bead 92a formed on a metal strip 92 which is secured to the side wall between the side wall and the cleat. When the beads 90a and 92a are interlocked, they occupy a recess 89b formed in the inner corner of the cleat 89 adjacent to the side wall. The strip 92 is bent away from the side wall 86 and the half-bead 92ª is formed by curling this inwardly bent portion outwardly toward the side wall so that it terminates in an edge 92ᵇ which is spaced from the adjacent face of the side wall a distance less than the width of the bead 90ª. This permits the parts to be assembled by locating the end wall 91 substantially in the position shown in Fig. 16 and then moving it in the direction of the arrow 93 until the bead 90ª engages and snaps into interlocking connection with the bead 92ª.

Figure 17:
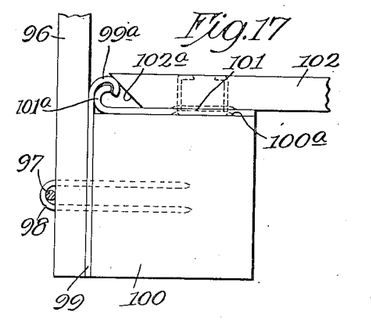
Fig. 17 is a horizontal section similar to that of Fig. 6, showing a further modification in which the interlocking beads are snapped into engagement with each other and occupy a recess formed by beveling the end of the end wall.
Figure 18:
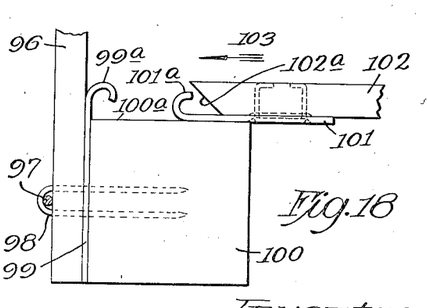
Fig. 18 is a horizontal section showing the parts of Fig. 17 before they have been snapped into assembled relationship.

In Figs. 17 and 18 there is illustrated a construction in which beads adapted to snap into engagement with each other are concealed merely by beveling the edges of the end wall. In this form, the side wall 96 is secured to the other folding walls of the box or crate by flexible binding wires 97 which are secured thereto by staples 98. A metal locking strip 99 is secured to the side wall 96 between the body portion of the side wall and the connected cleat 100 and the strip 99 extends inwardly beyond the face 100ª of the cleat and terminates in a half-bead 99ª adapted to interlock with a half-bead 101ª formed upon another metal locking strip 101 which contacts with the face 100ª of the cleat and is secured to the end wall 102. This end wall is provided along its vertical edges with beveled surfaces 102ª which are inclined away from the cleats 100 toward the adjacent side walls 96, thus forming vertically extending pockets or recesses in which the interlocking body portions of the metal strips are located when the end walls of the box or crate are assembled with respect to the side and bottom walls. These half-beads 99ª and 101ª may be passed into engagement with each other by a relative sliding motion parallel to their longitudinal axes or they may be snapped into engagement with each other by sliding the end wall over the surface 101ª of the cleat in the direction indicated by the arrow 103 in Fig. 18, until the bead 101ª snaps beneath the bead 99ª due to the resiliency of the metal of which the locking strips are formed.

Figures 21, 22:
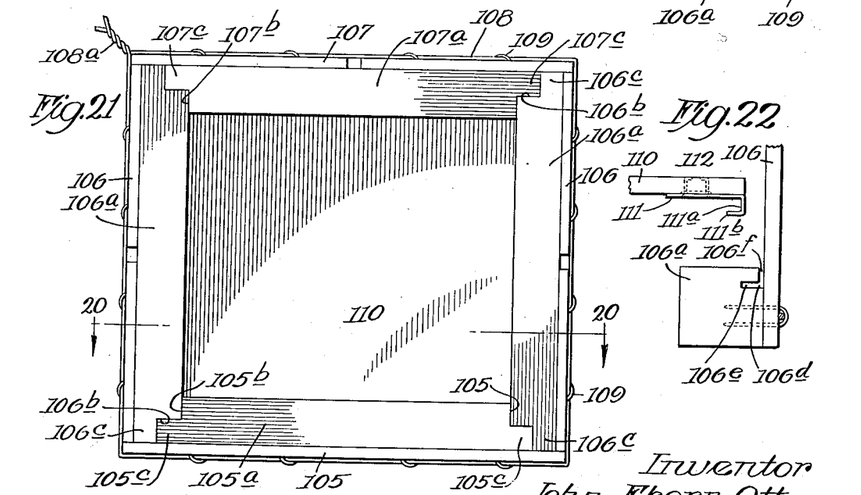
Fig. 21 is an end view of the completed crate embodying the folding walls of Fig. 19.
Fig. 22 is a top plan view of one end wall and a portion of a side wall of the crate shown in Fig. 21.

In Figs. 19 to 22, inclusive, there is shown another form of the invention similar to that of Fig. 1 except that the ends of the cleats of the side walls have a notched form to interfit with each other and a different construction is provided for interlocking the end walls with the cleats of the side walls. This form includes a bottom wall 105, a pair of side walls 106 and a top wall 107, all of which are secured together by a plurality of surrounding flexible binders 108 secured thereto by staples 109. Each wall is made up of one or more longitudinal members secured to a pair of transversely extending cleats. In this instance, the ends of the bottom wall 105 are secured to transverse cleats 105ª, the ends of the longitudinal members of the side walls are secured to cleats 106ª, and the ends of the longitudinal members of the top wall 107 are secured to cleats 107ª. All of these cleats are preferably formed of wood and are of rectangular cross-section with notches at their ends adapted to be engaged by portions of the ends of the cleats on adjacent wall members. The cleats 105ª have notches 105ᵇ in each end thereof forming projections 105ᶜ on each cleat adjacent the longitudinal members which are secured to the outer side thereof. The cleats 106ª on the side walls, which extend vertically when the walls are assembled as shown in Fig. 21, are provided at their ends with rectangular notches 106ᵇ forming tongues 106ᶜ adjacent the longitudinal members which are secured to the outer sides thereof. The cleats 107ª of the top wall are similar to the cleats 105ª of the bottom wall, being provided at their ends with transversely extending notches 107ᵇ, leaving projections 107ᶜ. The cleats 106ª are equal in length to the width of the side walls 106 and the cleats 105ª and 107ª are of lesser length than the width of the bottom and top walls 105 and 107, respectively, so that when the walls are folded to form an enclosure of rectangular cross-section, as shown in Fig. 21, the projections 105ᶜ on the cleats of the bottom wall fit into the notches 106ᵇ at the lower ends of the cleats 106ª of the side walls, and the projections 107ᶜ at the ends of the cleats on the top wall fit into the notches 106ᵇ which are formed in the upper end of the cleats on the side walls. When these parts are thus assembled with the cleats interfitting with each other as shown in Fig. 21, the ends of the binding wires 108 can be secured together in any suitable manner, for example, by twisting them together as shown at 108ª.

Before the top wall 107 is closed over the side walls and secured in place by twisting the ends of the binding wires together, the end walls 110 are put in position to hold the bottom wall and the side walls in box-forming relationship during the operation of filling the enclosure with the articles to be packed therein. Each end wall 110 is in the form of a flat plate having secured to the outer sides thereof, and along its vertical edges, a pair of metal strips 111. These strips may be secured in place by staples 112 and they have their outer edges reversely bent to form channel-shaped portions 111ª terminating in flanges 111ᵇ which are directed parallel to the body portion of the end wall and spaced outwardly therefrom. These channel-shaped portions 111ª are adapted to interlock with grooves 106ᵈ, of rightangular cross-section, which extend vertically in the cleats 106ª of the side walls adjacent to the longitudinal members of these side walls on the inner sides of the cleats, as shown particularly in Fig. 20. Each groove 106ᵈ comprises a portion 106ᵉ which extends at right angles to the longitudinal members of the side wall, and also a neck portion 106ᶠ which extends parallel to the body portion of the side wall and provides a slot engaged by a part of the channel-shaped portion 111ª of a strip on an end wall when the parts are assembled. During the process of assembly, the side walls 106 are first folded upwardly until they lie in vertical planes and then the end walls 110 are put in place by sliding them downwardly with the channel portions 111ª of the strips 111 having a telescoping engagement with the grooves 106ᵈ which are formed in the cleats of the side walls. These end walls then hold the side walls in their vertical positions while the crate is being filled and, when the filling has been completed, the top wall 107 may be folded over the side walls and end walls, as shown in Fig. 21, preliminary to twisting the ends of the binding wires 108 together.

In all of the forms of the invention heretofore described, the folding walls of the box or crate have been attached to each other by flexible binding wires in the manner common in wire-bound boxes or crates but the features of the present invention may also be employed in the construction of boxes or crates in which the folding walls are flexibly connected by means other than the usual binding wires and such a form of construction is illustrated in Figs. 23 to 27, inclusive. In this form, the folding walls include a bottom wall 115, a pair of side walls 116, a top wall 117 and an upper flap 118 which is attached to the edge of one of the side walls 116. All of these walls are formed from a single continuous sheet of fibreboard, cardboard or the like, which is preferably operated upon by suitable pressure devices to form longitudinal fold lines 119 which separate each wall from the adjacent connected wall or walls. The bottom wall has secured to the inner sides of the ends thereof a pair of cleats 115a which are beveled at their ends on angles of 45 degrees as shown at 115b and the side and top walls are similarly provided with cleats 116a and 117a, respectively, which are beveled at their ends on angles of 45 degrees, as shown at 116b and 117b. These beveled ends of the cleats on the wall sections permit them to be folded into the relationship shown in Fig. 24 with the beveled ends of the cleats on adjacent wall sections contacting with each other to form mitered joints. All of these cleats are secured to their respective walls by staples or wire stitching 120.

The cleats carried by the walls 115, 116, and 117 are engaged on their inner edges by the end walls 121 which are preferably formed of the material of which the folding walls are constructed and which have metal locking strips 122 secured along the vertical edges thereof by means of staples 123. These locking strips have inwardly turned beads 122a along their outer edges and these beads are adapted to have a telescoping interlocking engagement with beads 124a which are formed on metal locking strips 124 secured to the side walls and mounted between the body portions of these walls and the cleats 116a thereof. These beads may be moved into interlocking engagement with each other by a sliding action as explained in connection with the construction of Fig. 1 or they may be constructed to permit them to be snapped into engagement with each other as heretofore described. After the end walls 121 have been put in place and the top wall or cover 117 has been folded over them, the flap 118 is folded over the edge of the top cover and then the flexible binder in the form of a strap or wire, or more than one such binder, may be put around the box and the ends thereof connected together to reenforce the box and hold the cover in its closed position. It will be apparent that all of the modifications of the invention illustrated in Figs. 6 to 22, inclusive, may be employed in connection with a folding box of the type illustrated in Fig. 24.

Figure 19:
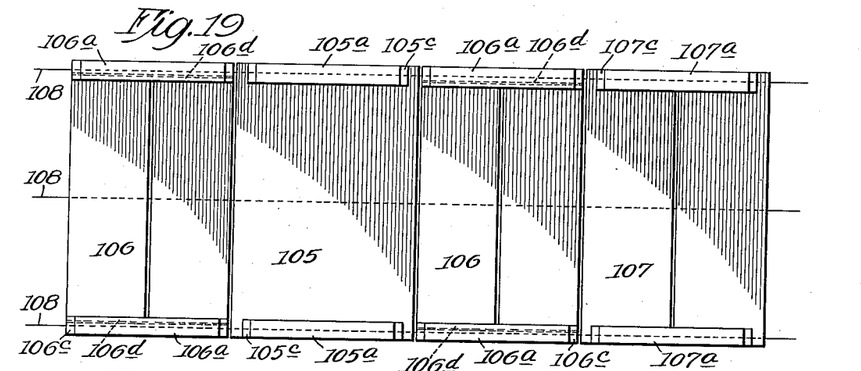
Fig. 19 shows a top plan view of the outer folding walls of another form of crate in which the cleats on these walls are notched at their extremities and are provided with grooves for connection with the end walls.
Figure 20:
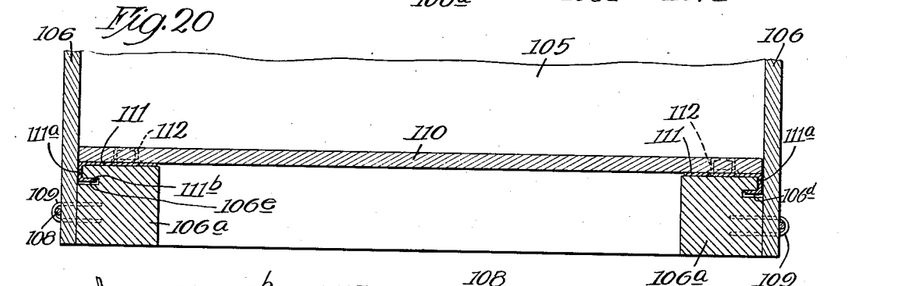
Fig. 20 shows a horizontal section on the line 20—20 of Fig. 21, showing the connection of the end wall with the cleats of the side walls having the form shown in Fig. 19.
Figure 23:
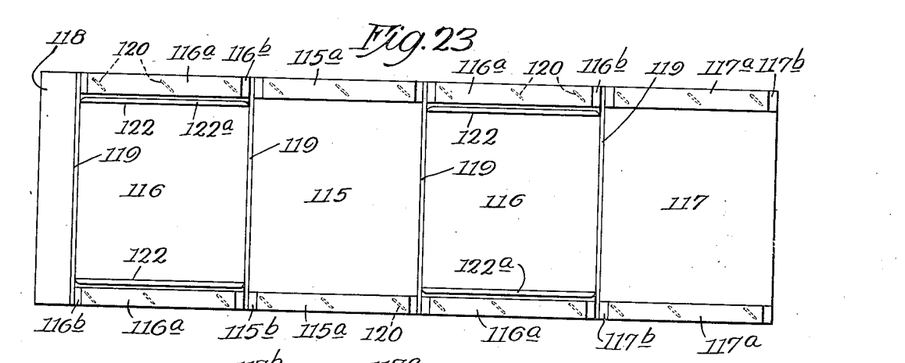
Fig. 23 is a top plan view of the outer folding walls of a box in which these walls are made up of fiberboard or the like having fold lines along the longitudinal edges or corners of the box.
Figures 24, 25, 26, 27:
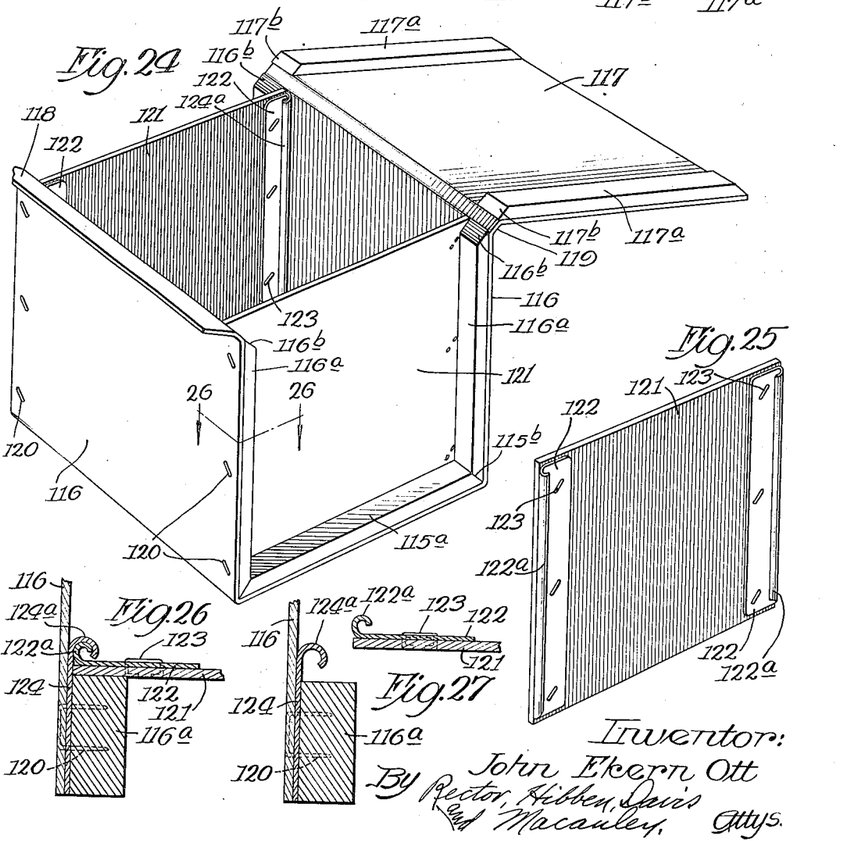
Fig. 24 is a perspective view of the complete box embodying the outer wall construction illustrated in Fig. 23, with the top wall or cover in open position.
Fig. 25 is a perspective view of one of the end walls embodied in the construction illustrated in Fig. 24.
Fig. 26 is an enlarged horizontal section taken on the line 26—26 of Fig. 24.
Fig. 27 is a horizontal section similar to that of Fig. 26, showing the parts before the interlocking beads have been passed into interlocking engagement with each other.

In any of the forms of the invention described above, the cleats which are carried by the end walls may be constructed at their ends to have a dove-tailed connection with each other, as shown in Figs. 1 to 4, inclusive, or they may have the notched construction shown in Figs. 19 and 21, or they may be beveled at their ends as shown in Figs. 23 and 24.

Although several forms of the invention have been shown and described by way of illustration, it will be understood that it may be constructed in still other embodiments coming within the scope of the appended claims.

I claim:

1. The combination in a folding box, of an end wall, a plurality of flexibly connected walls adapted to be folded about the edges of said end wall, and metal strips carried by said end wall and opposite folding walls and having beaded portions adapted to form telescoping engagement with each other along the vertical edges of said end wall, one of said beaded portions being open along one side to permit it to be snapped into engagement with the other beaded portion upon relative motion thereof transversely to a vertical edge of said end wall.

2. The combination in a folding box, of an end wall, a side wall, a metal strip secured to said end wall and having a vertical tubular bead at one edge thereof, and a second metal strip carried by said side wall and having a vertical tubular bead adapted to form a telescoping engagement with said first-named bead, one of said beads being open along one side to permit it to be snapped into telescoping engagement with the other bead upon pressing one against the other transversely to their longitudinal axes.

3. The combination in a folding box, of an end wall, a plurality of flexibly connected walls including a side wall adapted to engage a vertical edge of said end wall, a metal strip secured to said end wall and having a bead extending along said vertical edge thereof, and a second metal strip secured to said side wall and having an open bead along one edge thereof adapted to receive and form a telescoping engagement with said first-named bead.

4. The combination in a box, of an end wall, a side wall, a metal strip secured to said end wall and having the outer edge thereof turned inwardly to form a bead, a cleat secured to said side wall and bearing against the outer side of said end wall, and a metal strip secured to said side wall and having a part thereof turned inwardly to form a partial bead terminating in an edge spaced from the inner surface of said end wall a distance less than the thickness of said bead formed on said first-named strip, whereby said first-named bead can be snapped into interlocking engagement with said partial bead by moving said end wall transversely to the plane of said side wall.

5. The combination in a box, of an end wall, a metal strip secured to said end wall and having the outer edge thereof turned inwardly to form a bead, a cleat secured to said side wall and adapted to bear against the outer side of said end wall, and a metal strip secured to said side wall and having one edge thereof turned inwardly opposite said cleat to form a partial bead spaced from the face of said cleat which is adapted to be engaged by said end wall, said partial bead being positioned to form an interlocking engagement with said first named bead when said end wall is moved laterally toward said side wall.

6. The combination in a folding box, of a plurality of flexibly connected walls, cleats secured to opposite walls at their ends, an end wall adapted to bear against said cleats, elongated metal strips secured to said walls and terminating in hook-shaped edge portions spaced from said cleats, and other elongated metal strips secured to said end wall on the side thereof opposite said cleats and having edge portions positioned to engage and snap into interlocking engagement with the edge portions of said first named metal strips upon relative movement of said end wall and said opposite walls transversely to said opposite walls.

JOHN EKERN OTT.